T. D. WEST.
MOLD FOR MAKING CHILLED CAR WHEELS AND OTHER CIRCULAR OBJECTS.
APPLICATION FILED DEC. 10, 1908.
918,236.
Patented Apr. 13, 1909.
4 SHEETS—SHEET 1.
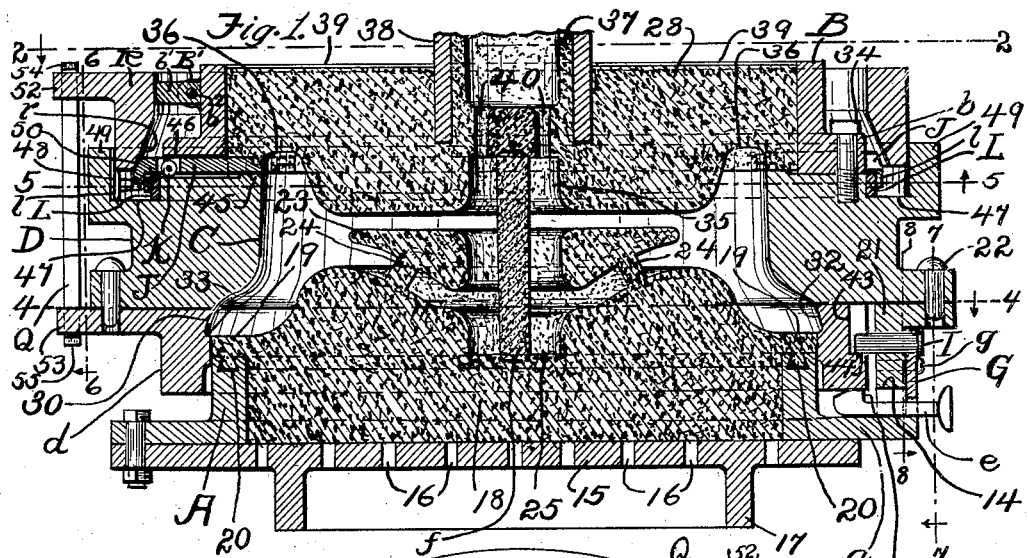
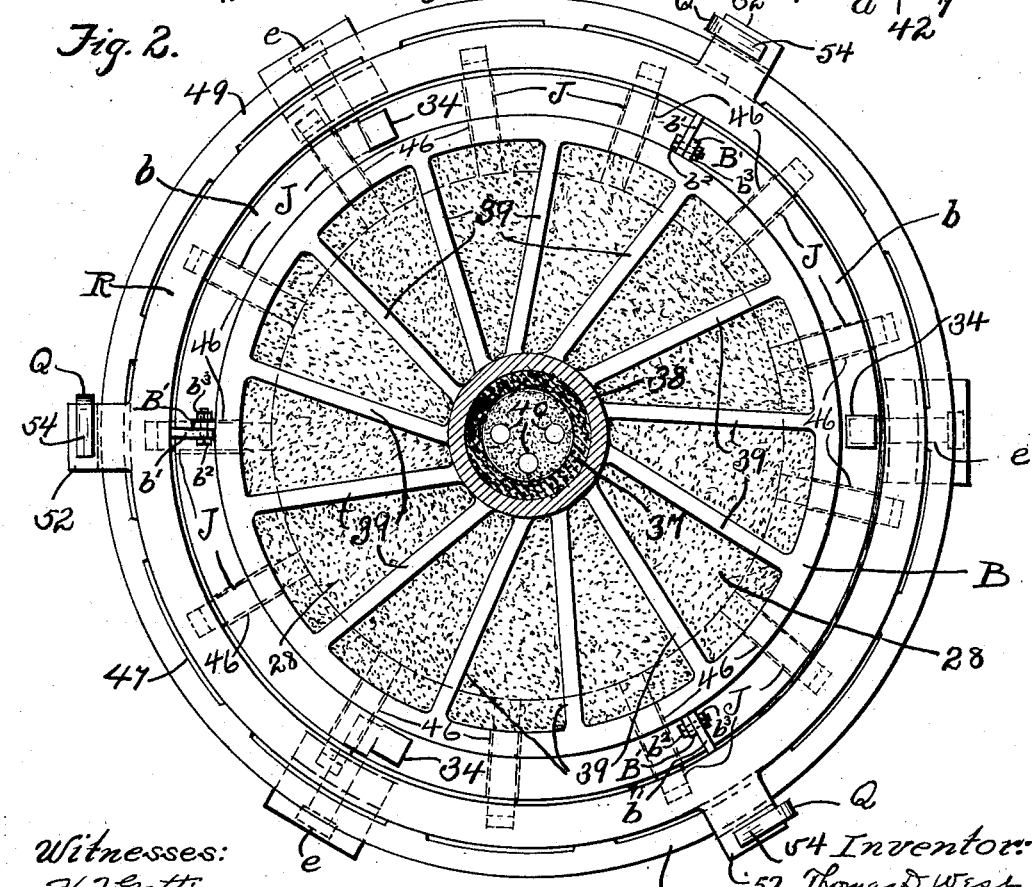
Witnesses:
H. J. Gettins
B. C. Brown
Inventor:
Thomas D. West
By
Attorneys.

T. D. WEST.
MOLD FOR MAKING CHILLED CAR WHEELS AND OTHER CIRCULAR OBJECTS.
APPLICATION FILED DEC. 10, 1908.
918,236.
Patented Apr. 13, 1909.
4 SHEETS—SHEET 2.
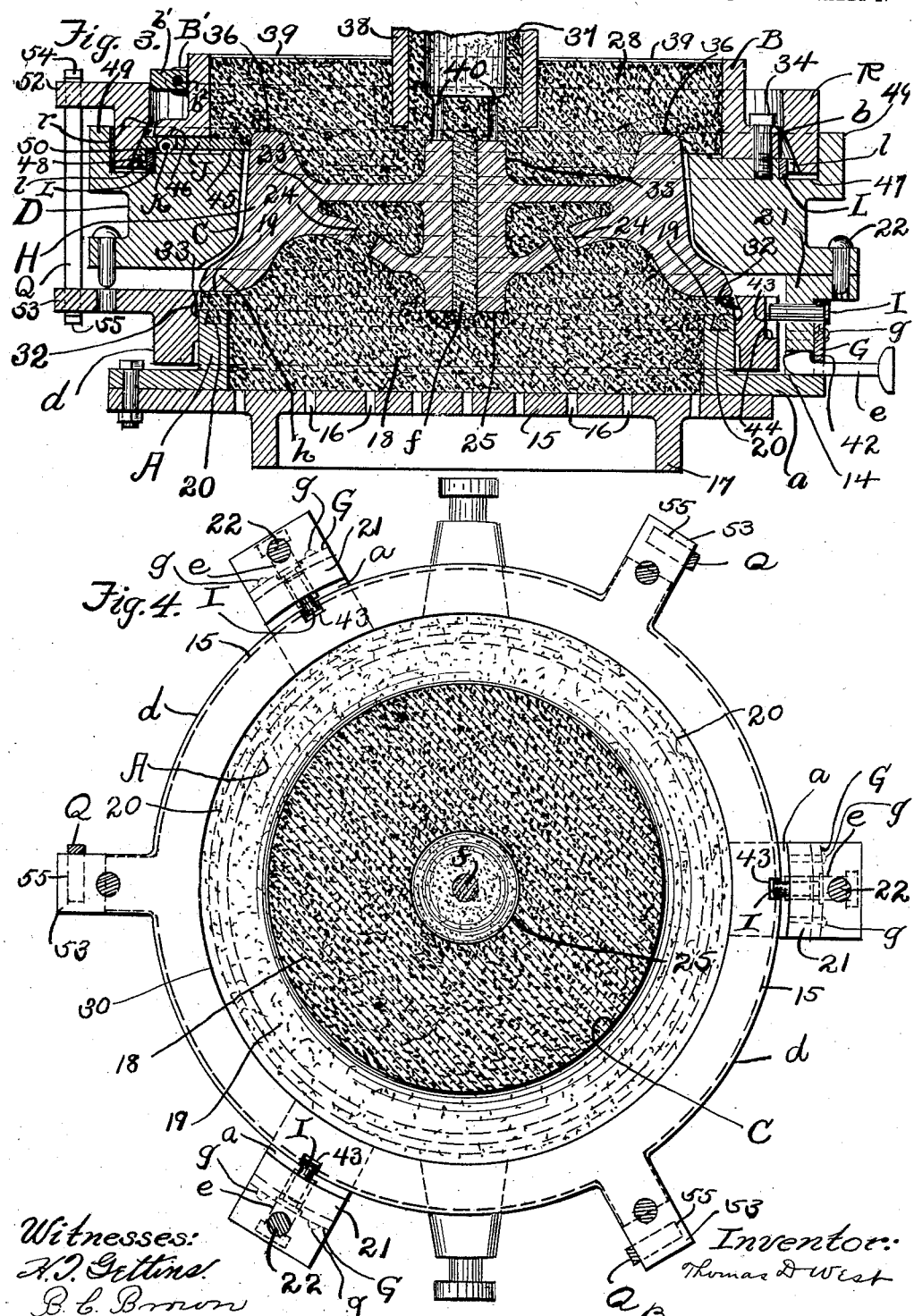

T. D. WEST.
MOLD FOR MAKING CHILLED CAR WHEELS AND OTHER CIRCULAR OBJECTS.
APPLICATION FILED DEC. 10, 1908.
918,236.
Patented Apr. 13, 1909.
4 SHEETS—SHEET 3.
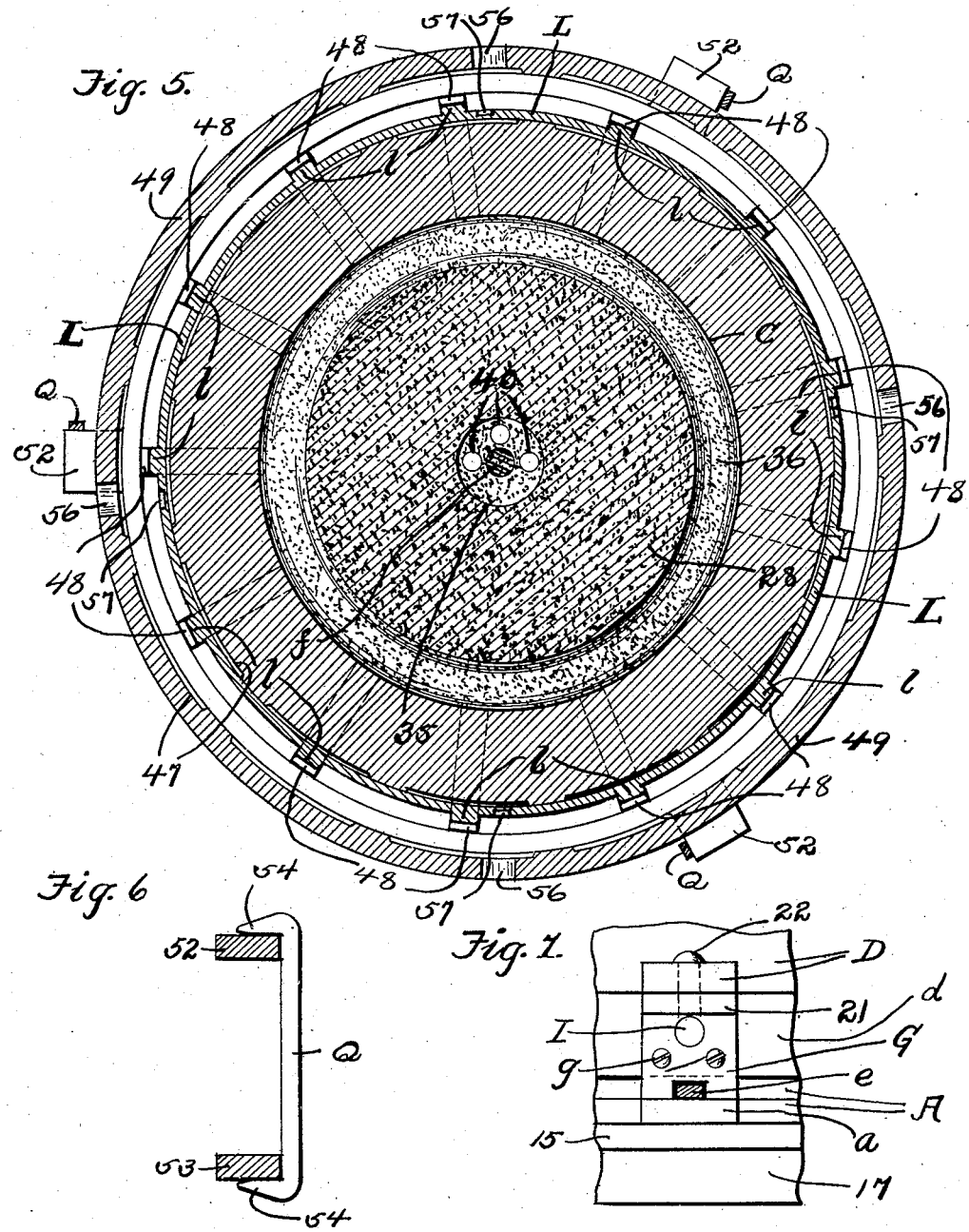
Witnesses:
N. J. Gittins
B. C. Brown
Inventor:
Thomas D. West
By
Attorneys.

T. D. WEST.
MOLD FOR MAKING CHILLED CAR WHEELS AND OTHER CIRCULAR OBJECTS.
APPLICATION FILED DEC. 10, 1908.
918,236.
Patented Apr. 13, 1909.
4 SHEETS—SHEET 4.
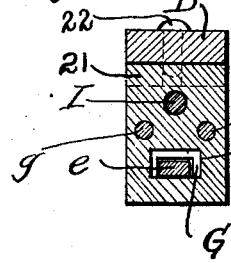
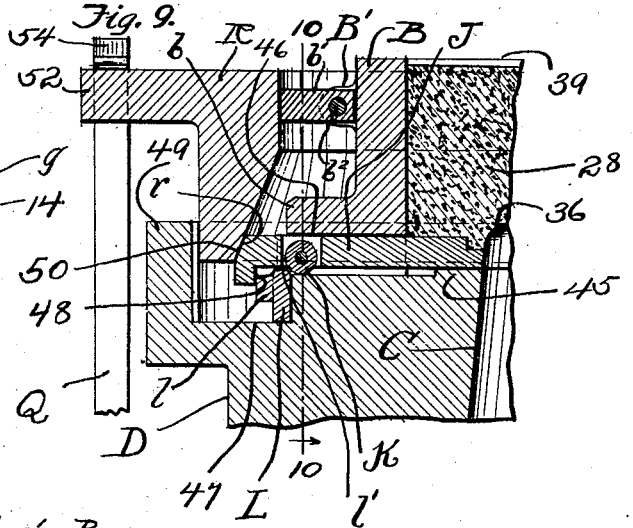
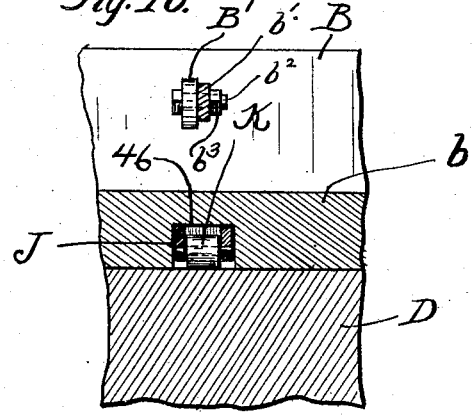

UNITED STATES PATENT OFFICE.

THOMAS D. WEST, OF SHARPSVILLE, PENNSYLVANIA.

MOLD FOR MAKING CHILLED CAR-WHEELS AND OTHER CIRCULAR OBJECTS.

No. 918,236.  Specification of Letters Patent.  Patented April 13, 1909.

Application filed December 10, 1908. Serial No. 466,840.

*To all whom it may concern:*

Be it known that I, THOMAS D. WEST, a citizen of the United States of America, residing at Sharpsville, in the county of Mercer and State of Pennsylvania, have invented certain new and useful Improvements in Molds for Making Chilled Car-Wheels and other Circular Objects; and I hereby declare the following to be a full, clear, and exact description of the invention, such as will enable others skilled in the art to which it pertains to make and use the same.

This invention relates to improvements in molds for casting circular objects, such, for instance, as chilled car-wheels, and pertains more especially to a mold for casting a wheel or circular object having a beveled flange at one end thereof. I would here remark that a chilled cast car-wheel whose chill is unequal in thickness is seriously defective because such an unequal thickness of the chill decreases the life of the wheel and may cause wrecks on railways.

The primary object of this invention is to provide a mold of the character indicated whereby the car-wheel or other circular object cast in the mold has a peripheral crust or shell which is uniform in thickness circumferentially of the said circular object.

Another object is to cast a car-wheel or other circular object which has all of its outer circumferentially extending or peripheral surfaces concentric relative to its axis or center.

Another object is to construct a mold of the character indicated which is convenient and reliable in its operation and whose component parts are assembled and separated with facility.

With these objects in view, and to the end of realizing other advantages hereinafter appearing, this invention consists in certain features of construction, and combinations of parts, hereinafter described, pointed out in the claims and illustrated in the accompanying drawings.

In the said drawings, Figure 1 is a central vertical section of my improved mold ready to be poured. Fig. 2 is a horizontal section on line 2—2, Fig. 1, looking downwardly. Fig. 3 is a central vertical section of the mold showing a car-wheel cast within and by the mold. Fig. 4 is a horizontal section on line 4—4, Fig. 1, looking downwardly. Fig. 5 is a horizontal section on line 5—5, Fig. 1, looking upwardly. Fig. 6 is a vertical section on line 6—6, Fig. 1, looking outwardly. Fig. 7 is a vertical section in detail on line 7—7, Fig. 1, looking inwardly. Fig. 8 is a vertical section in detail on line 8—8, Fig. 1, looking outwardly. Fig. 9 is a vertical section illustrative of the means employed in centering the casting at the upper end of the casting. Fig. 10 is a vertical section on line 10—10, Fig. 9, looking inwardly. Figs. 9 and 10 are drawn on a larger scale than the preceding figures.

My improved mold consists in the main of an upper mold-part or cope, a lower mold-part or drag and a central mold-part or chill.

Referring to Figs. 1, 3 and 4 of the drawings, A indicates an annular metal shell or casing which forms a portion of the lower mold-part or drag and is concentric relative to the center of the mold. The casing A is arranged vertically and rests upon a horizontally arranged metal plate 15 which is suitably secured to the said casing and forms the bottom of the drag, which bottom is provided with vent-holes 16 and a vertically downwardly projecting annular flange 17 to elevate the bottom above the floor or support upon which the mold is to be mounted. The drag is rammed with sand in any approved manner, and the body of packed sand 18 of the drag fills the chamber formed within the casing A and extends over and covers the upper end of the said casing, as at 19, and also fills a recess 20 which is formed in the upper edge and extends circumferentially of the said casing, which recess has its side walls undercut to assist in retaining in place the contents of the said recess and consequently the packed sand-covering of the said casing. The top of the sand-body 18 of the drag has the contour required to form the bottom of the casting.

B indicates (see Figs. 1, 2 and 3) an annular metal shell or casing which forms a portion of the upper mold-part or cope and is concentric relative to the center of the mold. The casing B is arranged vertically and supported as will hereinafter appear. The cope is rammed with sand in any approved manner, and the body of packed sand 28 of the cope substantially fills the chamber formed within the casing B. The bottom of the sand-body 28 of the cope has the contour required to form the top of the casting. The cope and the drag are spaced vertically. That is, the cope is arranged a suitable distance above the drag to form the chambers C between them, which chamber is enlarged diametrically and annularly at its lower end, as at 30 (see Figs. 1 and 4). The central mold-part or chill is annular and arranged vertically and centered relative to the drag and the cope, surrounding the chamber C and consisting of a stationary vertically arranged annular cast-iron body or section D arranged concentrically relative to the center of the mold, and a vertically or endwise shiftable cast-iron ring or annular section *d* arranged under and concentric relative to the said stationary chill-section. The endwise shiftable or lower chill-section *d* surrounds and loosely embraces the drag and is normally in its upper position and capable of being lowered as will hereinafter appear, being locked in its upper position by suitably supported movable bars *e*.

The flange of the car-wheel or flanged circular object to be cast in the mold is formed next above the sand-covering 19 of the drag-casing A, and the upper portion of the shiftable or lower chill-section *d* projects far enough above the said sand covering in the upper position of the said chill-section to form the periphery of the said flange. The said upper portion of the shiftable or lower chill-section *d* is provided internally with a downwardly and outwardly sloping or beveled annular surface 32 which, in the upper position of the said chill-section, forms the surrounding wall of the diametrically enlarged lower end of the chamber C and in casting forms the desired bevel on the periphery of the flange of the car-wheel or flanged circular object being cast. The shiftable or lower chill-section *d* slidably embraces the casing A of the drag and is guided during its endwise movement by the said casing which is externally circular and concentric relative to the center of the mold so that the said chill-section is always centered accurately relative to the center of the mold and its beveled or sloping surface 32 kept concentric relative to the center of the chamber C during the descent of the said chill-section. The lower extremity of the internal beveled surface 32 of the chill-section *d* is preferably somewhat larger diametrically than the next lower and drag-embracing portion of the said chill-section to form an upwardly facing annular shoulder 33 internally of the said chill-section at the said extremity of the said beveled surface and flush with the sand-covering 19 of the drag-casing A so that the under side of the outer portion of the aforesaid flange is formed by the said shoulder in casting.

The peripheral surface of the rim of the wheel or circular object to be cast between the flanged or lower end of the said wheel or object and the opposite or upper end of the object is formed by the internal surface of the stationary chill-section D which is arranged concentrically relative to the beveled or sloping surface 32 of the shiftable chill-section *d*. Obviously therefore the stationary chill-section D forms the surrounding wall of the chamber C between the shiftable chill-section *d* at the lower or diametrically larger end of the said chamber and the upper end of the chamber and is smaller in internal diameter between the diametrical enlargement 30 of the lower end of the said chamber and the upper end of the chamber than the shiftable chill-section but has the lower end of the bore formed therein flaring downwardly toward the shiftable chill-section *d* and meeting the upper extremity of the internal beveled surface 32 of the said shiftable chill-section in the upper position of the last-mentioned chill-section. The stationary chill-section is supported from the drag, and preferably the drag-casing A is provided at its lower end and externally and below the range of movement of the shiftable chill-section *d* with laterally and outwardly projecting lugs *a* which are spaced circumferentially of the drag and provided at their outer ends with upwardly projecting flanges 21 upon which the stationary chill-section D is mounted, and the latter is centered preferably relative to the drag by means of pins 22 which are borne by the last-mentioned chill-section and depend into the said flanges. The cope-casing B is enough larger in internal diameter than the stationary chill-section D to cause the said chill-section to be covered by the sand-body 28 of the cope around the bore in the said chill-section. The cope-casing B is provided at its lower end and externally with a laterally and outwardly projecting annular flange *b* and secured at the said flange, preferably removably by screws 34 to the stationary chill-section D so that the cope is supported from the said chill-section. The sand-body 28 of the cope is provided in its under side and centrally with a circular cavity 35 which is arranged in line vertically and corresponds in dimensions with a circular cavity 25 formed in and centrally of the top of the sand-body 18 of the drag. The sand-body 28 of the cope is provided in its under side and next the internal surface of the stationary chill-section D with an annular recess 36 which is arranged concentrically relative to the said chill-section and consequently circumferentially relative to the center of the chamber C and forms an upward annular enlargement of the said chamber.

The cope and the drag of the mold illustrated are rammed to more especially fit them for casting a car-wheel which has a hub provided with a central bore extending therethrough, and consequently a baked sand-core *f* is arranged vertically and centrally of the chamber C and extends through the said chamber and through the cavities 25 and 35 from within the bottom of the cavity 25 into the top wall of the cavity 35. To form an annular chamber within and centrally of the casting an annular sand-core 23 which has an internal diameter substantially corresponding with the diameter of the cavities 25 and 35 is arranged centrally of the chamber C and concentrically relative to the core $f$ and connected, as at 24, at a plurality of points with and supported from the sand-body 18 of the drag, and further supported or held in place if necessary by chaplets not shown. The top wall of the cope-cavity 35 forms the bottom of a circular pouring basin which has the surrounding wall 37 of its chamber built up of sand and inclosed by a metal casing 38 which is connected with the cope-casing B by webs 39 which are spaced circumferentially of the said basin and embedded in and instrumental in supporting the sand-body 28 of the cope. The pouring basin is formed centrally of the sand-body 28 of the cope and has its bottom provided with gates or perforations 40 which establish communication between the said basin and the cope-cavity 35. The molten metal employed in pouring the mold is supplied to the pouring-basin, thence flows through the gates or perforations 40 in the bottom of the said basin and through the cope-cavity 35 into the chamber C and fills every unoccupied portion of the said chamber. During the cooling of the molten metal with which the mold has been poured the casting formed in the mold contracts horizontally or diametrically and becomes smaller in external diameter during the cooling process and thereby frees the stationary chill-section D.

To maintain the tread and flange or entire circumferential surface of the casting exactly central relative to the mold it is important to afford a lateral bearing to the beveled peripheral surface of the said flange all around the flange during the cooling and horizontal contraction of the casting. By the descent of the shiftable chill-section during the horizontal contraction of the casting the internal beveled surface 32 of the said chill-section will remain in contact with and hug the beveled peripheral surface of the flange of the casting during the said contraction of the casting until the said chill-section has lowered far enough to free the casting, and the result is the production of a circumferentially chilled circular object which has its chill uniform in thickness circumferentially of and throughout the object, and has all of its outer circumferentially extending or peripheral surfaces concentric relative to the axis or center of the object. As already indicated the shiftable chill-section is locked in its upper position by movable bars $e$, but as soon as a crust or shell is formed on the casting after the pouring of the mold the said bars are shifted outwardly from under the said chill-section to render the said chill-section, so far as the said bars are concerned, free to descend by gravity, and the said chill-section, when rendered free to descend, will of course lower by gravity as fast as the casting contracts horizontally during the cooling of the casting. The bars $e$ are arranged substantially radially and spaced circumferentially of the mold below the shiftable chill-section $d$. The bars $e$ rest upon the lugs $a$ of the drag-casing A and are shiftable endwise. The bars $e$ project under and hold and lock the shiftable chill-section $d$ in its upper position or are removed from under the said chill-section according as the bars are at the one or the other extremity of their range of movement. The bars $e$ are provided near their inner ends and on top with outwardly facing shoulders 42, as shown in Figs. 1 and 3, and plates G which are attached, preferably removably by means of screws $g$, to the outer sides of the flanges 21 of the lugs $a$ loosely straddle the bars and are arranged to coöperate with the said shoulders in forming stops for limiting outward movement of the bars and prevent accidental detachment of the bars from the mold, said shoulders abutting against the inner sides of the said plates in the outer position of the bars, and the flanges 21 are slotted, as at 14, to accommodate the location of the bars. In Fig. 3 a bar $e$ is shown in its outer and inoperative position and consequently removed from under the shiftable chill-section $d$ and the said chill-section in this figure is shown lowered far enough to free the flange $h$ of the casting H shown formed in the mold. It will be observed that the sand-covered drag-casing A is arranged under and concentrically relative to the diametrical enlargement 30 of the lower end of the chamber C and consequently the flange of the casting is adequately supported to withstand any pressure exerted against its beveled peripheral surface by the shiftable chill-section.

Means for preventing detachment of the shiftable chill-section $d$ from the drag-casing A when the drag is turned down side up, either preparatory to the assemblage of the parts of the mold or after the separation of the stationary chill-section D and connected cope and the casting from the drag, are provided and preferably comprise pins I which extend loosely through the plates G and loosely through the flanges 21 a suitable distance above the bars $e$ into recesses 43 formed in the outer side of the shiftable chill-section $d$ and extending vertically downwardly from the upper extremity of the said chill-section and having their bottoms forming upwardly facing shoulders 44 which are overlapped by the said pins. It will be observed therefore that the shiftable chill-section is provided at its outer side with upwardly facing shoulders 44 spaced circumferentially of the said chill-section and overlapped by suitably supported pins I which are preferably withdrawable endwise from over the said shoulders to detach the said chill-section if desired from the drag, and that the extension of the recesses 43 to the upper extremity of the said chill-section accommodates the location of the pins I and avoids interference by the said pins with the descent of the said chill-section upon rendering the latter free to lower.

It is also important to have the upper end of the casting centered and kept centered accurately relative to the center of the mold during the cooling and horizontal contraction of the casting, and the means employed for keeping the upper end of the casting thus centered during the horizontal contraction of the casting comprises endwise movable bars J mounted on the stationary chill-section D and placed substantially radially and spaced circumferentially of the chill. Preferably the inner portion of the upper end of the chill-section D is somewhat raised, as at 45, (see Figs. 1 and 9) to afford bearing to the inner ends of the bars J, and the said bars to reduce the friction had between them and the said chill-section during the endwise movement of the bars to a minimum are provided between the said raised portion of the said chill-section and their outer ends with antifriction rollers K which rest upon the said chill-section. The casting-centering bars J loosely engage and extend through recesses 46 formed in the lower end of the cope, and the side walls of the said recesses prevent displacement of the said bars laterally or circumferentially of the chill. The bars J correspond in length and have their inner ends equidistant from a point centrally of the chamber C. The bars J in their outer position, as shown in Figs. 1, 9 and 10, have their inner ends arranged flush with the internal surface of the chill-section D and are arranged to enter the recess or upward enlargement 36 of the chamber C and are locked in their outer position by a ring L which is arranged concentrically relative to the chill and preferably loosely embraces the laterally and outwardly facing inner side wall of an annular recess 47 formed in the upper end and extending circumferentially of the chill-section D and arranged a suitable distance from and concentrically relative to the chamber C. The bars J extend over the bottom of the recess 47. The ring L is shiftable circumferentially of the chill and provided at its upper end and outer side with laterally and outwardly projecting lugs l spaced circumferentially of the ring and in the bar-locking or operative position of the said ring overlapping or engaging inwardly facing shoulders 48 formed on the outer ends of the bars J at the bottoms of the said bars. Obviously to render the bar-locking means formed by the ring L and its lugs l inoperative all that is required is to shift the said ring circumferentially of the chill far enough to free the shoulders 48 of the bars J from the lugs l of the said ring whereupon the bars are free to move inwardly. It will be observed that the body of the ring L at its outer side and between its lugs l is arranged to be engaged in the operative position of the ring by the shoulders 48 of the bars J when the latter are at the inner extremity of their range of movement and consequently limits the inner movements of the said bars. The body of the ring projects upwardly, as at l', Fig. 9, above the lower extremities of the rollers K of the casting-centering bars J so that the said upwardly projecting portion of the said ring coöperates with the rollers K of the said bars in forming stops for limiting the outward movement of the said bars.

Not unimportant is the actuation of the bars J inwardly simultaneously and equally and the maintenance of the bars at their inner ends in contact with the casting during the horizontal contraction of the casting so as to keep the casting at its upper end accurately centered relative to the center of the mold during the said contraction of the casting. The means for simultaneously actuating the bars J inwardly, when the said bars are unlocked from the bar-locking means, preferably comprise a vertically shiftable ring R which surrounds the cope and is arranged vertically and exactly centrally relative to the mold. The ring R is therefore arranged concentrically relative to the chamber C and forms an annular weight which at its lower end overlaps the outer ends of the bars J, and the outer side wall of the recess 47 in the chill-section D is, as already indicated, concentric relative to the chamber C and surrounds and affords lateral bearings to and guides the ring or weight R and maintains the latter in position centrally relative to the center of the mold. The said wall is preferably formed by an annular flange 49 which is formed on and projects upwardly from and is arranged concentrically relative to the chill-section D. The lower portion of the bore in the ring or weight R flares downwardly toward the lower end of the ring or weight to form an annular downwardly and outwardly sloping or beveled surface r internally of the lower end of the said ring or weight, which surface has the proper slope relative to the beveled surface of the shiftable chill-section d, and the outer ends of the bars J preferably have suitably beveled surfaces 50 which are overlapped by the aforesaid internal beveled surface r of the ring or weight R. It will be observed therefore that the ring or weight R is supported from the bars J and is held in its upper position while the said bars are locked in their outer position, and that the said ring or weight and the said bars have mutually engaging opposing surfaces which have such relative trend that the bars when unlocked are actuated inwardly during the descent of the said ring or weight. The ring or weight R is preferably not only guided externally by the flange 49 of the chill but also guided internally by the cope whose casing B is provided externally with several lugs B' which are spaced circumferentially of the casing, and plates b' are attached, preferably removably by suitably applied bolts b² and nuts b³, to the lugs B', which plates project laterally and outwardly into such close proximity to the internal surface of the ring or weight R above the internal beveled surface r of the said ring or weight so as to accurately center the said ring or weight relative to the cope and consequently relative to the center of the mold.

The ring or weight R is provided at its upper end and externally with laterally and outwardly projecting lugs 52 spaced circumferentially of the said ring or weight, and the shiftable chill-section d is provided at its upper end and externally with laterally and outwardly projecting lugs 53 spaced circumferentially of the said chill-section and arranged in line vertically with the lugs 52 of the bar-actuating ring or weight R, and clamps Q having upper jaws 54 engaging the top surfaces of the lugs 52 and lower jaws 55 engaging the under surfaces of the lugs 53 establish operative connection between the said chill-section and the ring or weight R and cause the latter and the said chill-section to move in unison. It will be observed that the shiftable chill-section d is supported from the ring or weight R after the bars e employed in holding and locking the said chill-section in its upper position independently of the operative connection of the said chill-section with the ring or weight R are removed from under the said chill-section to permit the latter to lower with the ring or weight R when the casting-centering bars J are unlocked and permitted to move inwardly.

To afford convenient access to the bar-locking ring L for shifting the said ring circumferentially to actuate it from the one to the other of its positions the flange 49 of the chill-section D (see Fig. 5) is provided with apertures 56 spaced circumferentially of the chill, and the said ring to facilitate the said shifting of it is provided in its outer side and adjacent the said aperture with cavities 57. Hence by suitably manipulating any bar or similar tool passed into engagement with a cavity 57 in the ring L through one of the apertures 56 in the flange 49 the said ring is readily shiftable in the one or the other direction according as the ring is to be actuated from its operative into its inoperative position or vice versa.

I would remark that although it is desirable in all cases to employ the casting-centering bars J as well as the internal beveled surface 32 of the shiftable chill-section in centering the casting during the horizontal contraction of the casting I do not wish to be understood as limiting myself to the use of the said bars, as in some cases the said bars might be omitted and the aforesaid beveled surface of the shiftable chill-sectional one used in centering the casting.

What I claim is:—

1. A mold of the character indicated comprising a suitably rammed lower mold-part or drag; a suitably rammed and suitably supported upper mold-part or cope arranged a suitable distance above the drag to form a chamber between the drag and the cope, which chamber has an inlet for the passage of molten metal to the chamber, and a chill surrounding the chamber and comprising an annular endwise shiftable section provided internally with a circumferentially extending sloping surface which in the normal position of the said chill-section forms the surrounding wall of a portion of the chamber at one end of the chamber, said chill also comprising a suitably supported annular section forming the surrounding wall of the chamber between the opposite end of the chamber and the first-mentioned chill-section, and the latter when free to be shifted being capable of movement to keep it a suitable length of time in contact at its aforesaid sloping surface with the casting during the horizontal contraction of the casting formed in and by the mold.

2. A mold of the character indicated comprising a lower mold-part or drag; an upper mold-part or cope arranged a suitable distance above the drag to form a chamber between the drag and the cope, which chamber has an inlet for the passage of molten metal to the chamber, and a chill surrounding the chamber and comprising an annular endwise shiftable section provided internally with an annular beveled surface which in the normal position of the said chill-section forms the surrounding wall of a portion of the chamber at one end of the chamber, said chill also comprising a relatively stationary annular section forming the surrounding wall of the chamber between the opposite end of the chamber and the shiftable chill-section.

3. A mold of the character indicated comprising a lower mold-part or drag; an upper mold-part or cope arranged a suitable distance above the drag to form a chamber between the drag and the cope, which chamber has an inlet for the passage of molten metal to the chamber and is diametrically enlarged at one end, and a chill surrounding the chamber and comprising an annular endwise shiftable section which in its normal position surrounds the aforesaid diametrical enlargement of the chamber and is provided internally with a circumferentially extending sloping surface forming the surrounding wall of a portion of the chamber at the diametrically enlarged end of the chamber, said chill also comprising a suitably supported annular section forming the surrounding wall of the chamber between the opposite end of the chamber and the first-mentioned chill-section.

4. A mold of the character indicated comprising a lower mold-part or drag; an upper mold-part or cope arranged a suitable distance above the drag to form a chamber between the drag and the cope, which chamber has an inlet for the passage of molten metal to the chamber and is diametrically enlarged at one end, and a chill surrounding the chamber and comprising an annular endwise shiftable section which in its normal position surrounds the aforesaid diametrical enlargement of the chamber and is provided internally with an annular beveled surface forming the surrounding wall of a portion of the chamber at the diametrically enlarged end of the chamber, said chill also comprising a relatively stationary annular section forming the surrounding wall of the chamber between the opposite end of the chamber and the shiftable chill-section and being smaller than the shiftable chill-section in internal diameter between the diametrically enlarged end and other end of the chamber, and the shiftable chill-section when free to be shifted being capable of movement to keep it a suitable length of time in contact at its aforesaid beveled surface with the casting during the horizontal contraction of the casting formed in and by the mold.

5. A mold of the character indicated comprising a lower mold-part or drag; an upper mold-part or cope arranged a suitable distance above the drag to form a chamber between the drag and the cope, which chamber has an inlet for the passage of molten metal to the chamber and is diametrically enlarged at one end, and a chill surrounding the chamber and comprising an annular endwise shiftable section which in its normal position surrounds the aforesaid diametrical enlargement of the chamber and is provided internally with an annular beveled surface forming the surrounding wall of a portion of the chamber at the diametrically enlarged end of the chamber, siad chill also comprising a relatively stationary annular section forming the surrounding wall of the chamber between the opposite end of the chamber and the shiftable chill-section and being smaller than the shiftable chill-section in internal diameter between the diametrically enlarged end and the other end of the chamber but having the bore formed therein flaring toward the said shiftable chill-section.

6. A mold of the character indicated comprising a lower mold-part or drag; an upper mold-part or cope arranged a suitable distance above the drag to form a chamber between the drag and the cope, which chamber has an inlet for the passage of molten metal to the chamber, and a chill surrounding the chamber and comprising an annular endwise shiftable section provided internally with a circumferentially extending sloping surface which in the normal position of the said chill-section forms the surrounding wall of a portion of the chamber at one end of the chamber, said chill also comprising an annular section which forms the surrounding wall of the chamber between the opposite end of the chamber and the first-mentioned chill-section and supports the cope and is supported from the drag.

7. A mold of the character indicated comprising a lower mold-part or drag; an upper mold-part or cope arranged a suitable distance above the drag to form a chamber between the drag and the cope, which chamber has an inlet for the passage of molten metal to the chamber, and a chill surrounding the chamber and comprising an annular endwise shiftable section provided internally with an annular beveled surface which in the normal position of the said chill-section forms the surrounding wall of a portion of the chamber at one end of the chamber, said chill also comprising a suitably supported annular section arranged concentric relative to the aforesaid beveled surface and forming the surrounding wall of the chamber between the opposite end of the chamber and the first-mentioned chill-section.

8. A mold of the character indicated comprising a lower mold-part or drag; an upper mold-part or cope arranged a suitable distance above the drag to form a chamber between the drag and the cope, which chamber has an inlet for the passage of molten metal to the chamber; a chill surrounding the chamber and comprising an annular endwise shiftable section provided internally of one end thereof with a circumferentially extending sloping surface which is arranged concentrically relative to the center of the mold and slopes laterally and outwardly toward the other end of the said chill-section and in the normal position of the said chill-section forms the surrounding wall of a portion of the chamber at one end of the chamber, said chill also comprising a relatively stationary annular section forming the surrounding wall of the chamber between the opposite end of the chamber and the shiftable chill-section and being arranged concentrically relative to the aforesaid sloping surface, and means whereby the shiftable chill-section is guided during its endwise movement to maintain the said sloping surface concentric relative to the center of the mold.

9. A mold of the character indicated comprising a lower mold-part or drag; an upper mold-part or cope arranged a suitable distance above the drag to form a chamber between the drag and the cope, which chamber has an inlet for the passage of molten metal to the chamber; a chill surrounding the chamber and comprising an annular endwise shiftable section provided internally with a circumferentially extending sloping surface which in the normal position of the said chill-section forms the surrounding wall of a portion of the chamber at one end of the chamber, said chill also comprising a relatively stationary annular section forming the surrounding wall of the chamber between the opposite end of the chamber and the shiftable chill-section, and means for locking or holding the shiftable chill-section in its normal position, said locking means being adapted to be rendered inoperative to permit the last-mentioned chill-section to be kept a suitable length of time in contact at its aforesaid sloping surface with the casting during the horizontal contraction of the casting formed in and by the mold.

10. A mold of the character indicated comprising a lower mold-part or drag; an upper mold-part or cope arranged a suitable distance above the drag to form a chamber between the drag and the cope, which chamber has an inlet for the passage of molten metal to the chamber; a chill forming the surrounding wall of the chamber; suitably supported movable bars spaced circumferentially of the chill, said bars being normally arranged to enter the chamber, and means whereby the said bars are simultaneously actuated inwardly and kept in contact with the casting during the horizontal contraction of the casting formed in and by the mold.

11. A mold of the character indicated comprising a lower mold-part or drag; an upper mold-part or cope arranged a suitable distance above the drag to form a chamber between the drag and the cope, which chamber has an inlet for the passage of molten metal to the chamber; an annular chill forming the surrounding wall of the chamber; suitably supported endwise movable bars placed substantially radially and spaced circumferentially of the chill, said bars being normally in their outer position and arranged to enter the chamber and having their inner ends equidistant from a point centrally of the chamber, and means whereby the said bars are actuated inwardly in unison and kept a suitable length of time in contact at their inner ends with the casting during the horizontal contraction of the casting formed in and by the mold.

12. A mold of the character indicated comprising a lower mold-part or drag; an upper mold-part or cope arranged a suitable distance above the drag to form a chamber between the drag and the cope, which chamber has an inlet for the passage of molten metal to the chamber; an annular chill forming the surrounding wall of the chamber; suitably supported endwise movable bars placed substantially radially and spaced circumferentially of the chill, and corresponding in length, said bars being normally in their outer position and arranged to enter the chamber and having their inner ends equidistant from a point centrally of the chamber, and means whereby the said bars are actuated inwardly in unison and kept in contact at their inner ends with the casting during the horizontal contraction of the casting formed in and by the mold.

13. A mold of the character indicated comprising a lower mold-part or drag; an upper mold-part or cope arranged a suitable distance above the drag to form a chamber between the drag and the cope, which chamber has an inlet for the passage of molten metal to the chamber; a chill forming the surrounding wall of the chamber; suitably supported movable bars spaced circumferentially of the chill and being normally in position to move into the chamber; means whereby the bars are locked in their outer and normal position, said bar-locking means being shiftable to free the bars and thereby permit inward movement of the bars, and means whereby the bars when unlocked are movable inwardly simultaneously.

14. A mold of the character indicated comprising a lower mold-part or drag; an upper mold-part or cope arranged a suitable distance above the drag to form a chamber between the drag and the cope, which chamber has an inlet for the passage of molten metal to the chamber; a chill forming the surrounding wall of the chamber; movable bars supported from and spaced circumferentially of the chill and being normally in position to move into the chamber, and means whereby the bars are locked in their outer position, said bar-locking means being supported from the chill and shiftable to free the bars and thereby permit inward movement of the bars.

15. A mold of the character indicated comprising a lower mold-part or drag; an upper mold-part or cope arranged a suitable distance above the drag to form a chamber between the drag and the cope, which chamber has an inlet for the passage of molten metal to the chamber; an annular chill forming the surrounding wall of the chamber; suitably supported endwise movable bars placed substantially radially and spaced circumferentially of the chill and normally in their outer position and in the said position being arranged to move into the chamber, said bars being provided at their outer ends with inwardly facing shoulders; a suitably supported bar-locking member extending and shiftable circumferentially of and arranged concentrically relative to the chill and provided with lugs which in the operative position of the bar-locking member overlap the aforesaid shoulders in the outer position of the bars and lock the bars in the said position but free the bars to permit the latter to move inwardly upon shifting the bar-locking member circumferentially to render its lugs inoperative.

16. A mold of the character indicated comprising a lower mold-part or drag; an upper mold-part or cope arranged a suitable distance above the drag to form a chamber between the drag and the cope, which chamber has an inlet for the passage of molten metal to the chamber; an annular chill forming the surrounding wall of the chamber; movable bars spaced circumferentially of and supported from the chill and being normally in position to move into the chamber, said bars being provided a suitable distance from their inner ends with inwardly facing shoulders, and a bar-locking member extending and shiftable circumferentially of and arranged concentrically relative to and supported from the chill, said bar-locking member being provided with lugs which in the operative position of the said bar-locking member overlap the aforesaid shoulders in the outer position of the bars and lock the bars in the said position but free the bars to permit the latter to move inwardly upon shifting the bar-locking member circumferentially to render its lugs inoperative.

17. A mold of the character indicated comprising a lower mold-part or drag; an upper mold-part or cope arranged a suitable distance above the drag to form a chamber between the drag and the cope, which chamber has an inlet for the passage of molten metal to the chamber; an annular chill forming the surrounding wall of the chamber and provided a suitable distance from the chamber with a recess which extends circumferentially of the chill and is arranged concentrically relative to the chamber; suitably supported movable bars spaced circumferentially of the chill and being normally in position to move into the chamber and extending over the bottom of the said recess and provided in suitable proximity to their outer extremities with inwardly facing shoulders, and a bar-locking member arranged within the said recess and being shiftable circumferentially of the chill, said bar-locking member being provided with lugs which in its operative position overlap the aforesaid shoulders in the outer position of the bars and lock the bars in the said position but free the bars to permit the latter to move inwardly upon shifting the bar-locking member circumferentially to render its lugs inoperative.

18. A mold of the character indicated comprising a lower mold-part or drag; an upper mold-part or cope arranged a suitable distance above the drag to form a chamber between the drag and the cope, which chamber has an inlet for the passage of molten metal to the chamber; an annular chill forming the surrounding wall of the chamber and provided a suitable distance from the chamber with an annular recess which is arranged concentrically relative to the chamber; movable bars spaced circumferentially of the chill and being normally in position to move into the chamber and extending over the bottom of the said recess and provided a suitable distance from the outwardly facing side wall of the recess with inwardly facing shoulders, and a bar-locking member extending circumferentially of and having lateral bearing against the said wall of the recess, said bar-locking member being shiftable circumferentially of the chill and being provided with lugs which in its operative position overlap the aforesaid shoulders in the outer position of the bars and lock the bars in the said position but free the bars to permit the latter to move inwardly upon shifting the bar-locking member circumferentially to render its lugs inoperative.

19. A mold of the character indicated comprising a lower mold-part or drag; an upper mold-part or cope arranged a suitable distance above the drag to form a chamber between the drag and the cope, which chamber has an inlet for the passage of molten metal to the chamber; an annular chill forming the surrounding wall of the chamber and provided in its upper end and a suitable distance from the chamber with a recess which extends circumferentially of the chill and is arranged concentrically relative to the chamber; movable bars mounted on and spaced circumferentially of the chill and being normally in position to move into the chamber and extending over the bottom of the said recess and provided at their outer ends and at the bottom with inwardly facing shoulders; a bar-locking member arranged within the said recess and extending and being shiftable circumferentially of the chill, said bar-locking member being provided with lugs which in its operative position overlap the aforesaid shoulders in the outer position of the bars and lock the bars in the said position but free the bars to permit the latter to move inwardly upon shifting the bar-locking member circumferentially to render its lugs inoperative.

20. A mold of the character indicated comprising a lower mold-part or drag; an upper mold-part or cope arranged a suitable distance above the drag to form a chamber between the drag and the cope, which chamber has an inlet for the passage of molten metal to the chamber; a chill forming the surrounding wall of the chamber and provided a suitable distance from the chamber with an annular recess which is arranged concentric relative to the chamber; endwise movable bars supported from and placed substantially radially and spaced circumferentially of the chill and normally in their outer position and in the said position being arranged to move into the aforesaid chamber, said bars being provided at their outer ends and at the bottom with inwardly facing shoulders; a suitably supported bar-locking ring loosely embracing the laterally and outwardly facing side wall of the recess, said ring being shiftable circumferentially of the chill and provided at its outer side with lugs which in the operative position of the ring overlap the aforesaid shoulders in the outer position of the bars and lock the bars in the said position but free the bars to permit the latter to move inwardly upon shifting the ring circumferentially to render its lugs inoperative.

21. A mold of the character indicated comprising a lower mold-part or drag; an upper mold-part or cope arranged a suitable distance above the drag to form a chamber between the drag and the cope, which chamber has an inlet for the passage of molten metal to the chamber; a chill forming the surrounding wall of the chamber; suitably supported and suitably operated endwise movable bars placed radially and spaced circumferentially of the chill and normally in their outer position and in the said position being arranged to move into the aforesaid chamber; means for preventing lateral displacement of the bars, and means for limiting inward movement of the bars.

22. A mold of the character indicated comprising a lower mold-part or drag; an upper mold-part or cope arranged a suitable distance above the drag to form a chamber between the drag and the cope, which chamber has an inlet for the passage of molten metal to the chamber; a chill forming the surrounding wall of the chamber; suitably supported and suitably actuated endwise movable bars placed radially and spaced circumferentially of the chill and normally in their outer position and in the said position being arranged to move into the chamber, and means for limiting endwise movement of the bars.

23. A mold of the character indicated comprising a lower mold-part or drag; an upper mold-part or cope arranged a suitable distance above the drag to form a chamber between the drag and the cope; which chamber has an inlet for the passage of molten metal to the chamber; a chill forming the surrounding wall of the chamber; suitably supported endwise movable bars placed radially and spaced circumferentially of the chill and normally in their outer position and in the said position being arranged to move into the chamber; means for preventing lateral displacement of the bars, and means for simultaneously exerting pressure inwardly against the outer ends of the bars and thereby actuating the bars inwardly in unison.

24. A mold of the character indicated comprising a lower mold-part or drag; an upper mold-part or cope arranged a suitable distance above the drag to form a chamber between the drag and the cope, which chamber has an inlet for the passage of molten metal to the chamber, said cope being provided in its lower end and externally of the chamber with recesses which are arranged substantially radially of and spaced circumferentially of the cope; a chill forming the surrounding wall of the chamber, and suitably supported and suitably actuated endwise movable bars engaging and extending through the aforesaid recesses and normally in their outer position and in the said position being arranged to move into the chamber.

25. A mold of the character indicated comprising a lower mold-part or drag; an upper mold-part or cope arranged a suitable distance above the drag to form a chamber between the drag and the cope, which chamber has an inlet for the passage of molten metal to the chamber; a chill forming the surrounding wall of the chamber, and suitably actuated endwise movable bars placed radially and spaced circumferentially of the chill and normally in their outer position and in the said position being arranged to move into the aforesaid chamber, said bars having bearing at their inner ends upon the chill and being provided a suitable distance from the said ends with antifriction rollers resting on the chill.

26. A mold of the character indicated comprising a lower mold-part or drag; an upper mold-part or cope arranged a suitable distance above the drag to form a chamber between the drag and the cope; which chamber has an inlet for the passage of molten metal to the chamber; a chill forming the surrounding wall of the chamber; suitably supported bars spaced circumferentially of the chill and movable into and out of the chamber and normally in their outer position and in the said position being arranged to move into the chamber; means whereby the said bars are locked in their outer position, said bar-locking means being adapted to be rendered inoperative, and a suitably supported ring provided internally with a sloping annular surface operatively engaging the bars, said ring when the bars are unlocked being free to move endwise and thereby cause its aforesaid sloping surface to actuate the bars inwardly.

27. A mold of the character indicated comprising a lower mold-part or drag; an upper mold-part or cope arranged a suitable distance above the drag to form a chamber between the drag and the cope, which chamber has an inlet for the passage of molten metal to the chamber; a chill forming the surrounding wall of the chamber; suitably supported bars spaced circumferentially of the chill and equidistantly from the center of the chamber, said bars being movable into and out of the chamber and normally in their outer position and in the said position being arranged to move in the chamber; means whereby the said bars are locked in their outer position, said bar-locking means being adapted to be rendered inoperative; a suitably supported ring operatively engaging the bars and being free, when the bars are unlocked, to move endwise, and means whereby the said ring is guided and maintained concentric relative to the mold during the endwise movement of the ring, and the ring and the bars having mutually engaging surfaces which have such relative trend that the bars are moved inwardly during the endwise movement of the ring in the required direction.

28. A mold of the character indicated comprising a lower mold-part or drag; an upper mold-part or cope arranged a suitable distance above the drag to form a chamber between the drag and the cope; which chamber has an inlet for the passage of molten metal to the chamber; a chill forming the surrounding wall of the chamber; suitably supported endwise movable bars placed substantially radially and spaced circumferentially of the chill and normally in their outer position and in the said position being arranged to move into the chamber; means whereby the said bars are locked in their outer position, said bar-locking means being adapted to be rendered inoperative; a suitably supported ring overlapping the outer ends of the bars and being provided internally with a sloping annular surface engaging the said ends of the bars, said ring when the bars are unlocked being free to move endwise and thereby cause its aforesaid sloping surface to actuate the bars inwardly, and a lateral bearing for the said ring.

29. A mold of the character indicated comprising a lower mold-part or drag; an upper mold-part or cope arranged a suitable distance above the drag to form a chamber between the drag and the cope, which chamber has an inlet for the passage of molten metal to the chamber; a chill forming the surrounding wall of the chamber; suitably supported endwise movable bars placed radially and spaced circumferentially of the chill and normally in their outer position and in the said position being arranged to move into the chamber; means whereby the bars are locked in their outer position, said bar-locking means being adapted to be rendered inoperative, and a ring overlapping the outer ends of the bars and supported by the bars when the bars are locked in their outer position, said ring being free to lower when the bars are unlocked and provided internally with a downwardly and outwardly sloping annular surface engaging the said ends of the bars and arranged to actuate the bars inwardly during the descent of the ring.

30. A mold of the character indicated comprising a lower mold-part or drag; an upper mold-part or cope arranged a suitable distance above the drag to form a chamber between the drag and the cope, which chamber has an inlet for the passage of molten metal to the chamber; a chill forming the surrounding wall of the chamber; suitably supported endwise movable bars placed substantially radially and spaced circumferentially of the chill and normally in their outer position and in the said position being arranged to move into the chamber; means whereby the bars are locked in their outer position, said bar-locking means being adapted to be rendered inoperative, and a ring overlapping the outer ends of the bars and supported by the bars when the bars are locked in their outer position, said ring being concentric relative to the chamber and free to lower when the bars are unlocked and provided internally with a downwardly and outwardly sloping annular surface engaging the said ends of the bars and arranged to actuate the bars inwardly during the descent of the ring, and means for guiding the ring to maintain the ring concentric relative to the chamber during the movement of the ring.

31. A mold of the character indicated comprising a lower mold-part or drag; an upper mold-part or cope arranged a suitable distance above the drag to form a chamber between the drag and the cope, which chamber has an inlet for the passage of molten metal to the chamber; a chill forming the surrounding wall of the chamber; suitably supported bars movable into and out of the chamber and normally in their outer position and in the said position being arranged to move into the chamber; means whereby the bars are locked in their outer position, said bar-locking means being adapted to be rendered inoperative, and a ring overlapping the outer ends of the bars and supported by the bars when the bars are locked in their outer position, said ring being concentric relative to the chamber and free to lower when the bars are unlocked and provided internally with a downwardly and outwardly sloping annular surface operatively engaging the said ends of the bars and arranged to actuate the bars inwardly during the descent of the ring, and means for guiding the ring to maintain the ring concentric relative to the chamber during the movement of the ring, said ring-guiding means being borne by the cope.

32. A mold of the character indicated comprising a lower mold-part or drag; an upper mold-part or cope arranged a suitable distance above the drag to form a chamber between the drag and the cope, which chamber has an inlet for the passage of molten metal to the chamber; a chill forming the surrounding wall of the chamber; suitably supported endwise movable bars placed substantially radially of and spaced circumferentially of the chill and normally in their outer position and in the said position being arranged to move into the chamber; means whereby the bars are locked in their outer position, said bar-locking means being adapted to be rendered inoperative, and a ring overlapping the outer ends of the bars and supported by the bars when the bars are locked in their outer position, said ring being concentric relative to the chamber and free to lower when the bars are unlocked and provided internally with a downwardly and outwardly sloping annular surface engaging the said ends of the bars and arranged to actuate the bars inwardly during the descent of the ring, and laterally and outwardly projecting members borne by and spaced circumferentially of the cope and arranged to guide the ring and maintain the ring concentric relative to the mold during the movement of the ring.

33. A mold of the character indicated comprising a lower mold-part or drag; an upper mold-part or cope arranged a suitable distance above the drag to form a chamber between the drag and the cope, which chamber has an inlet for the passage of molten metal to the chamber; a chill forming the surrounding wall of the chamber; suitably supported bars movable into and out of the chamber and normally in their outer position and in the said position being arranged to move into the chamber; means whereby the bars are locked in their outer position, said bar-locking means being adapted to be rendered inoperative, and a weight operatively connected with the bars and being free when the bars are unlocked to lower and to actuate the bars inwardly.

34. A mold of the character indicated comprising a lower mold-part or drag; an upper mold-part or cope arranged a suitable distance above the drag to form a chamber between the drag and the cope, which chamber has an inlet for the passage of molten metal to the chamber; a chill forming the surrounding wall of the chamber; suitably supported endwise movable bars placed substantially radially and spaced circumferentially of the chill and normally in their outer position and in the said position being arranged to move into the chamber, means whereby the bars are locked in their outer position, said bar-locking means being adapted to be rendered inoperative, and an annular weight overlapping the outer ends of the bars and supported by the bars when the bars are locked in their outer position, said weight being free to lower when the bars are unlocked and provided internally with a downwardly and outwardly sloping annular surface engaging the said ends of the bars and arranged to actuate the bars inwardly during the descent of the weight.

35. A mold of the character indicated comprising a lower mold-part or drag; an upper mold-part or cope arranged a suitable distance above the drag to form a chamber between the drag and the cope, which chamber has an inlet for the passage of molten metal to the chamber; a chill surrounding the chamber and comprising an annular endwise shiftable section which is provided internally with a circumferentially extending sloping surface which in the normal position of the said chill-section forms the surrounding wall of a portion of the chamber at one end of the chamber, said chill also comprising a relatively stationary annular section forming the surrounding wall of the chamber between the opposite end of the chamber and the shiftable chill-section; means whereby the casting formed in and by the mold is during its contraction centered relative to the last-mentioned end of and relative to the chamber, and means for locking the shiftable chill-section in its normal position, said locking means being adapted to be rendered inoperative to permit the shiftable chill-section to move endwise and maintain its aforesaid sloping surface in contact with the casting during the horizontal contraction of the casting formed in and by the mold.

36. A mold of the character indicated comprising a lower mold-part or drag; an upper mold-part or cope arranged a suitable distance above the drag to form a chamber between the drag and the cope, which chamber has an inlet for the passage of molten metal to the chamber; a chill surrounding the chamber and comprising an annular vertically shiftable lower section which has an internal downwardly and outwardly sloping surface which in the upper position of the said chill-section forms the lower end of the surrounding wall of the chamber, said chill also comprising a suitably supported annular upper section which forms the surrounding wall of the chamber between the lower chill-section and the cope, and means for locking the lower chill-section in its upper position, said locking means being adapted to be rendered inoperative to permit the last-mentioned chill-section to lower.

37. A mold of the character indicated comprising a lower mold-part or drag; an upper mold-part or cope arranged a suitable distance above the drag to form a chamber between the drag and the cope, which chamber is diametrically enlarged at its lower end and has an inlet for the passage of molten metal to the chamber; a chill surrounding the chamber and comprising an annular vertically shiftable lower section which in its upper position surrounds the aforesaid diametrical enlargement of the chamber and has an internal downwardly and outwardly sloping surface which in the said position of the said chill-section forms the lower end of the surrounding wall of the chamber, said chill also comprising a suitably supported annular upper section which forms the surrounding wall of the chamber between the lower chill-section and the cope and is smaller than the last-mentioned chill-section in internal diameter between its upper end and the diametrically enlarged lower end of the chamber, and means for locking the lower chill-section in its upper position, said locking means being adapted to be rendered inoperative to permit the last-mentioned chill-section to lower.

38. A mold of the character indicated comprising a lower mold-part or drag; an upper mold-part or cope arranged a suitable distance above the drag to form a chamber between the drag and the cope, which chamber has an inlet for the passage of molten metal to the chamber; a chill surrounding the said chamber and comprising an annular endwise shiftable lower section which has an internal downwardly and outwardly sloping surface which in the upper position of the said chill-section forms the lower end of the surrounding wall of the chamber, said chill also comprising a suitably supported annular upper section which forms the surrounding wall of the chamber between the lower chill-section and the cope, and suitably supported means for locking the lower chill-section in its upper position, said locking means being adapted to be rendered inoperative to permit the last-mentioned chill-section to lower.

39. A mold of the character indicated comprising a lower mold-part or drag; an upper mold-part or cope arranged a suitable distance above the drag to form a chamber between the drag and the cope, which chamber has an inlet for the passage of molten metal to the chamber; a chill surrounding the said chamber and comprising an annular vertically shiftable lower section which has an internal downwardly and outwardly sloping surface which in the upper position of the said chill-section forms the lower end of the surrounding wall of the chamber, said chill also comprising an upper annular section which supports the cope and forms the surrounding wall of the chamber between the lower chill-section and the cope and is supported from the drag, and means for locking the lower chill-section in its upper position, said locking means being supported from the drag and adapted to be rendered inoperative to permit the last-mentioned chill-section to lower.

40. A mold of the character indicated comprising a lower mold-part or drag; an upper mold-part or cope arranged a suitable distance above the drag to form a chamber between the drag and the cope, which chamber has an inlet for the passage of molten metal to the chamber and is diametrically enlarged at its lower end; a chill surrounding the chamber and comprising an annular vertically shiftable lower section which in its upper position surrounds the aforesaid diametrical enlargement of the chamber and has an internal downwardly and outwardly sloping surface which forms the lower end of the surrounding wall of and is arranged concentrically relative to the chamber, said chill also comprising a suitably supported upper annular section which forms the surrounding wall of the chamber between the lower chill-section and the cope and is smaller than the lower chill-section in internal diameter between its upper end and the diametrically enlarged lower end of the chamber, and means for locking the lower chill-section in its upper position, said locking means being adapted to be rendered inoperative to permit the last-mentioned chill-section to lower.

41. A mold of the character indicated comprising a lower mold-part or drag; an upper mold-part or cope arranged a suitable distance above the drag to form a chamber between the drag and the cope, which chamber has an inlet for the passage of molten metal to the chamber; a chill surrounding the chamber and comprising an annular vertically shiftable lower section which is provided at its outer side with upwardly facing shoulders spaced circumferentially of the said chill-section and has an internal downwardly and outwardly sloping surface which in the upper position of the said chill-section forms the lower end of the surrounding wall of the chamber, said chill also comprising a suitably supported annular upper section which forms the surrounding wall of the chamber between the lower chill-section and the cope; pins overlapping the aforesaid shoulders and supported from the drag, and means for locking the lower chill-section in its upper position, said locking means being adapted to be rendered inoperative to permit the last-mentioned chill-section to lower.

42. A mold of the character indicated comprising a lower mold-part or drag; an upper mold-part or cope arranged a suitable distance above the drag to form a chamber between the drag and the cope, which chamber has an inlet for the passage of molten metal to the chamber; a chill surrounding the chamber and comprising an annular vertically shiftable lower section which is provided at its outer side with recesses spaced circumferentially of the said chill-section and extending from the upper extremity of the said chill section vertically downwardly and having upwardly facing shoulders formed by the bottoms of the recesses, said chill-section having an internal downwardly and outwardly sloping surface which in the upper position of the said chill-section forms the lower end of the surrounding wall of the chamber, said chill also comprising a suitably supported annular upper section which forms the surrounding wall of the chamber between the lower chill-section and the cope; pins supported from the drag and overlapping the aforesaid shoulders, and means for locking the lower chill-section in its upper position, said locking means being adapted to be rendered inoperative to permit the last-mentioned chill-section to lower.

43. A mold of the character indicated comprising a lower mold-part or drag; an upper mold-part or cope arranged a suitable distance above the drag to form a chamber between the drag and the cope, which chamber has an inlet for the passage of molten metal to the chamber; a chill surrounding the chamber and comprising an annular vertically shiftable lower section which is provided in its outer side with recesses spaced circumferentially of the said chill-section and extending from the upper extremity of the said chill-section vertically downwardly and having bottoms forming upwardly facing shoulders, said chill-section having an internal downwardly and outwardly sloping surface which in the upper position of the said chill-section forms the lower end of the surrounding wall of the chamber, said chill also comprising a suitably supported annular upper section which forms the surrounding wall of the chamber between the lower chill-section and the cope; pins supported from the drag and overlapping the aforesaid shoulders, which pins are withdrawable endwise from said shoulders, and means for locking the lower chill-section in its upper position, said locking means being adapted to be rendered inoperative to permit the last-mentioned chill-section to lower.

44. A mold of the character indicated comprising a lower mold-part or drag provided a suitable distance below its upper end and externally with laterally and outwardly projecting lugs spaced circumferentially of the drag, which lugs are provided at their outer ends with upwardly projecting flanges; an upper mold-part or cope arranged a suitable distance above the drag to form a chamber between the drag and the cope, which chamber has an inlet for the passage of molten metal to the chamber; a chill surrounding the chamber and comprising an annular vertically shiftable lower section which is provided externally with recesses extending from the upper extremity of the ring vertically downwardly and having bottoms forming upwardly facing shoulders, which chill-section has an internal downwardly and outwardly sloping surface which in the upper position of the said chill-section forms the lower end of the surrounding wall of the chamber, said chill also comprising a suitably supported annular upper section which forms the surrounding wall of the chamber between the lower chill-section and the cope; pins extending loosely through and having bearing in the aforesaid flanges and overlapping the aforesaid shoulders, and means for locking the lower chill-section in its upper position, said locking means being adapted to be rendered inoperative to permit the last-mentioned chill-section to lower.

45. A mold of the character indicated comprising a lower mold-part or drag provided a suitable distance below its upper end and externally with laterally and outwardly projecting lugs spaced circumferentially of the drag, which lugs are provided at their outer ends with upwardly projecting flanges; an upper mold-part or cope arranged a suitable distance above the drag to form a chamber between the drag and the cope, which chamber has an inlet for the passage of molten metal to the chamber; a chill surrounding the chamber and comprising an annular vertically shiftable lower section which has an internal downwardly and outwardly sloping surface which in the upper position of the said chill-section forms the lower end of the surrounding wall of the chamber, said chill also comprising a suitably supported annular upper section which supports the cope and is attached to the aforesaid flanges and forms the surrounding wall of the chamber between the lower chill-section and the cope, and means for locking the said lower chill-section in its upper position, said locking means being adapted to be rendered inoperative to permit the last-mentioned chill-section to lower.

46. A mold of the character indicated comprising a lower mold-part or drag; an upper mold-part or cope arranged a suitable distance above the drag to form a chamber between the drag and the cope, which chamber has an inlet for the passage of molten metal to the chamber; a chill surrounding the chamber and comprising an annular vertically shiftable lower section which has an internal downwardly and outwardly sloping surface which in the upper position of the said chill-section forms the lower end of the surrounding wall of the chamber, said chill also comprising a suitably supported annular upper section which forms the surrounding wall of the chamber between the lower chill-section and the cope, and suitably supported movable bars spaced circumferentially of the mold, said bars extending under the lower chill-section and locking the latter in its upper position, or being removed from under the last-mentioned chill-section, according as the bars are at the one or the other extremity of their range of movement.

47. A mold of the character indicated comprising a lower mold-part or drag; an upper mold-part or cope arranged a suitable distance above the drag to form a chamber between the drag and the cope, which chamber has an inlet for the passage of molten metal to the chamber; a chill surrounding the said chamber and comprising an annular vertically shiftable lower section which in its upper position surrounds the chamber and has an internal downwardly and outwardly sloping surface which in the said position of the said chill-section forms the lower end of the surrounding wall of the chamber, said chill also comprising a suitably supported annular upper section which forms the surrounding wall of the chamber between the lower chill-section and the cope, and movable bars spaced circumferentially of the mold and supported from the drag, said bars extending under the lower chill-section and locking the latter in its upper position, or removed from under the last-mentioned chill-section, according as the bars are at the one or the other extremity of their range of movement.

48. A mold of the character indicated comprising a lower mold-part or drag; an upper mold-part or cope arranged a suitable distance above the drag to form a chamber between the drag and the cope, which chamber has an inlet for the passage of molten metal to the said chamber; a chill surrounding the chamber and comprising an annular vertically shiftable lower section which in its upper position surrounds the chamber and has an internal downwardly and outwardly sloping surface which in the said position of the said chill-section forms the lower end of the surrounding wall of the chamber, said chill also comprising a suitably supported annular upper section which forms the surrounding wall of the chamber between the lower chill-section and the cope, and endwise movable bars arranged substantially radially and spaced circumferentially of the mold, said bars extending under the lower chill-section and locking the latter in its upper position, or removed from under the last-mentioned chill-section, according as the bars are at the one or the other extremity of their range of movement.

49. A mold of the character indicated comprising a lower mold-part or drag; an upper mold-part or cope arranged a suitable distance above the drag to form a chamber between the drag and the cope, which chamber has an inlet for the passage of molten metal to the chamber; a chill surrounding the chamber and comprising an annular vertically shiftable lower section which in its upper position surrounds the chamber and has an internal downwardly and outwardly sloping surface which in the said position of the said chill-section forms the lower end of the surrounding wall of the chamber, said chill also comprising a suitably supported annular upper section which forms the surrounding wall of the chamber between the lower chill-section and the cope; endwise movable bars arranged substantially radially and spaced circumferentially of the mold and supported from the drag, said bars extending under and locking the lower chill-section in its upper position, or removed from under the last-mentioned chill-section, according as the bars are at the one or the other extremity of their range of movement, and means limiting outward movement of the bars and supported from the drag.

50. A mold of the character indicated comprising a lower mold-part or drag; an upper mold-part or cope arranged a suitable distance above the drag to form a chamber between the drag and the cope, which chamber has an inlet for the passage of molten metal to the chamber; a chill surrounding the chamber and comprising an annular vertically shiftable lower section which in its upper position surrounds the chamber and has an internal downwardly and outwardly sloping surface which in the said position of the said chill-section forms the lower end of the surrounding wall of the chamber, said chill also comprising a suitably supported annular upper section which forms the surrounding wall of the chamber between the lower chill-section and the cope; endwise movable bars spaced circumferentially of the mold and extending under the lower chill-section and thereby locking the latter in its upper position, or removed from under the last-mentioned chill-section, according as the bars are at the one or the other extremity of their range of movement, said bars being provided with outwardly facing shoulders, and plates supported from the drag and arranged to coöperate with the said shoulders in forming stops for limiting outward movement of the bars.

51. A mold of the character indicated comprising a lower mold-part or drag provided a suitable distance below its upper end and externally with laterally and outwardly projecting lugs spaced circumferentially of the drag, which lugs are provided at their outer ends with upwardly projecting flanges; an upper mold-part or cope arranged a suitable distance above the drag to form a chamber between the drag and the cope, which chamber has an inlet for the passage of molten metal to the chamber; a chill surrounding the chamber and comprising an annular vertically shiftable lower section which in its upper position surrounds the chamber and has an internal downwardly and outwardly sloping surface which in the said position of the said chill-section forms the lower end of the surrounding wall of the chamber, said chill also comprising an annular upper section which is supported from the aforesaid flanges and forms the surrounding wall of the chamber between the lower chill-section and the cope; endwise movable bars arranged substantially radially and spaced circumferentially of the mold and resting on and extending loosely through and beyond the outer sides of the aforesaid flanges, said bars projecting under the lower chill-section and locking the latter in its upper position or removed from under the last-mentioned chill-section according as the bars are at the one or the other extremity of their range of movement and having outwardly facing shoulders and plates attached to the aforesaid flanges and straddling the said bars and arranged to coöperate with the said shoulders in forming stops for limiting outward movement of the bars.

52. A mold of the character indicated comprising a lower mold-part or drag; an upper mold-part or cope arranged a suitable distance above the drag to form a chamber between the drag and the cope, which chamber has an inlet for the passage of molten metal to the chamber; a chill surrounding the chamber and comprising an annular vertically shiftable lower section which has an internal downwardly and outwardly sloping surface which in the upper position of the said chill-section forms the surrounding wall of the lower end of the chamber and in the lower position of the said chill-section is arranged below the chamber, said chill also comprising a suitably supported annular upper section which forms the surrounding wall of the chamber between the lower chill-section and the cope; movable members spaced circumferentially of the mold and extending under the lower chill-section and locking the latter in its upper position, or removed from under the last-mentioned chill-section, according as they are at the one or the other extremity of their range of movement.

53. A mold of the character indicated comprising a lower mold-part or drag; an upper mold-part or cope arranged a suitable distance above the drag to form a chamber between the drag and the cope, which chamber has an inlet for the passage of molten metal to the chamber and is diametrically enlarged at its lower end; a chill surrounding the chamber and comprising an annular vertically shiftable lower section which has an internal downwardly and outwardly sloping annular surface which in the upper position of the said chill-section forms the surrounding wall of the aforesaid diametrically enlarged end of the chamber, said chill also comprising a suitably supported annular upper section forming the surrounding wall of the chamber between the lower chill-section and the cope and being smaller in internal diameter than the last-mentioned chill-section between the upper end and the diametrically enlarged lower end of the chamber; means for locking the lower chill-section in its upper position, said locking means being adapted to be rendered inoperative to permit the last-mentioned chill-section to lower and maintain its aforesaid beveled surface in contact with the casting during the horizontal contraction of the casting formed in and by the mold, and the drag comprising an annular metal casing arranged under and concentrically relative to the diametrically enlarged lower end of the aforesaid chamber.

54. A mold of the character indicated comprising a lower mold-part or drag; an upper mold-part or cope arranged a suitable distance above the drag to form a chamber between the drag and the cope, which chamber has an inlet for the passage of molten metal to the chamber and is diametrically enlarged at its lower end; a chill surrounding the chamber and comprising an annular vertically shiftable lower section which has an internal downwardly and outwardly sloping annular surface which in the upper position of the said chill-section forms the surrounding wall of the aforesaid diametrically enlarged end of the chamber, said chill also comprising a suitably supported annular upper section forming the surrounding wall of the chamber between the lower chill-section and the cope and being smaller in internal diameter than the last-mentioned chill-section between its upper end and the diametrically enlarged lower end of the chamber; means for locking the lower chill-section in its upper position, said locking means being adapted to be rendered inoperative to permit the lower chill-section to lower and maintain its aforesaid beveled surface in contact with the casting during the horizontal contraction of the casting formed in and by the mold, and the drag comprising an annular metal casing which is arranged under and concentrically relative to the diametrical enlargement of the lower end of the aforesaid chamber and has its upper edge covered by a layer of packed sand which forms the bottom of the said enlargement of the chamber.

55. A mold of the character indicated comprising a lower mold-part or drag; an upper mold-part or cope arranged a suitable distance above the drag to form a chamber between the drag and the cope, which chamber has an inlet for the passage of molten metal to the chamber and is diametrically enlarged at its lower end; a chill surrounding the chamber and comprising an annular vertically shiftable lower section which has an internal downwardly and outwardly sloping annular surface which in the upper position of the said chill-section forms the surrounding wall of the aforesaid diametrically enlarged end of the chamber, said chill also comprising a suitably supported annular upper section forming the surrounding wall of the chamber between the lower chill-section and the cope and being smaller in internal diameter than the last-mentioned chill-section between its upper end and the diametrically enlarged lower end of the chamber; means for locking the lower chill-section in its upper position, said locking means being adapted to be rendered inoperative to permit the last-mentioned chill-section to lower and maintain its aforesaid beveled surface in contact with the casting during the horizontal contraction of the casting formed in and by the mold, and the drag comprising an annular metal casing arranged under and concentrically relative to the diametrically enlarged lower end of the aforesaid chamber, which casing is provided in its upper edge with a recess having undercut side walls and extending circumferentially of the casing, said edge being covered by a layer of packed sand, which layer extends into and occupies the said recess.

56. A mold of the character indicated comprising a lower mold-part or drag; an upper mold-part or cope arranged a suitable distance above the drag to form a chamber between the drag and the cope, which chamber has an inlet for the passage of molten metal to the chamber; a chill surrounding the chamber and comprising an annular vertically shiftable lower section which is provided with an internal downwardly and outwardly sloping surface which in the upper position of the said chill-section forms the surrounding wall of the lower end of the chamber, said chill also comprising a suitably supported annular upper section which forms the surrounding wall of the chamber between the lower chill-section and the cope; means for locking the lower chill-section in its upper position, said locking means being adapted to be rendered inoperative to thereby permit the last-mentioned chill-section to lower; suitably supported shiftable bars normally arranged to move into the aforesaid chamber, means for actuating the said bars inwardly, and such a connection between the said bar-actuating means and the lower chill-section that the latter can only lower during the inward movement of the bars by the bar-actuating means.

57. In a mold of the character indicated comprising a lower mold-part or drag; an upper mold-part or cope arranged a suitable distance above the drag to form a chamber between the drag and the cope, which chamber has an inlet for the passage of molten metal to the chamber; a chill surrounding the chamber and comprising an annular vertically shiftable lower section which is provided with an internally downwardly and outwardly sloping surface which in the upper position of the said chill-section forms the surrounding wall of the lower end of the chamber, said chill also comprising a suitably supported annular upper section which forms the surrounding wall of the chamber between the lower chill-section and the cope; means for locking the lower chill-section in its upper position, said locking means being adapted to be rendered inoperative to thereby permit the last-mentioned chill-section to lower; suitably supported endwise movable bars placed substantially radially and spaced circumferentially of the upper portion of the chill and being normally in their outer position and in the said position being arranged to move into the aforesaid chamber; means whereby the said bars are locked in their outer position, said bar-locking means being shiftable to free the bars and thereby permit the inward movement of the bars; means whereby the said bars when the bars are rendered free to move inwardly are actuated inwardly, and such a connection between the said bar-actuating means and the lower chill-section that the latter can only lower during the inward movement of the said bars by the bar-actuating means.

In testimony whereof, I sign the foregoing specification, in the presence of two witnesses.

THOMAS D. WEST.

Witnesses:
C. H. DORER,
B. C. BROWN.